Sept. 5, 1972     H. L. OSBORNE ET AL     3,689,252
RUNNER SYSTEM FOR CAST HOUSE, AND METHOD
OF SEPARATING IRON AND SLAG
Filed Nov. 9, 1970
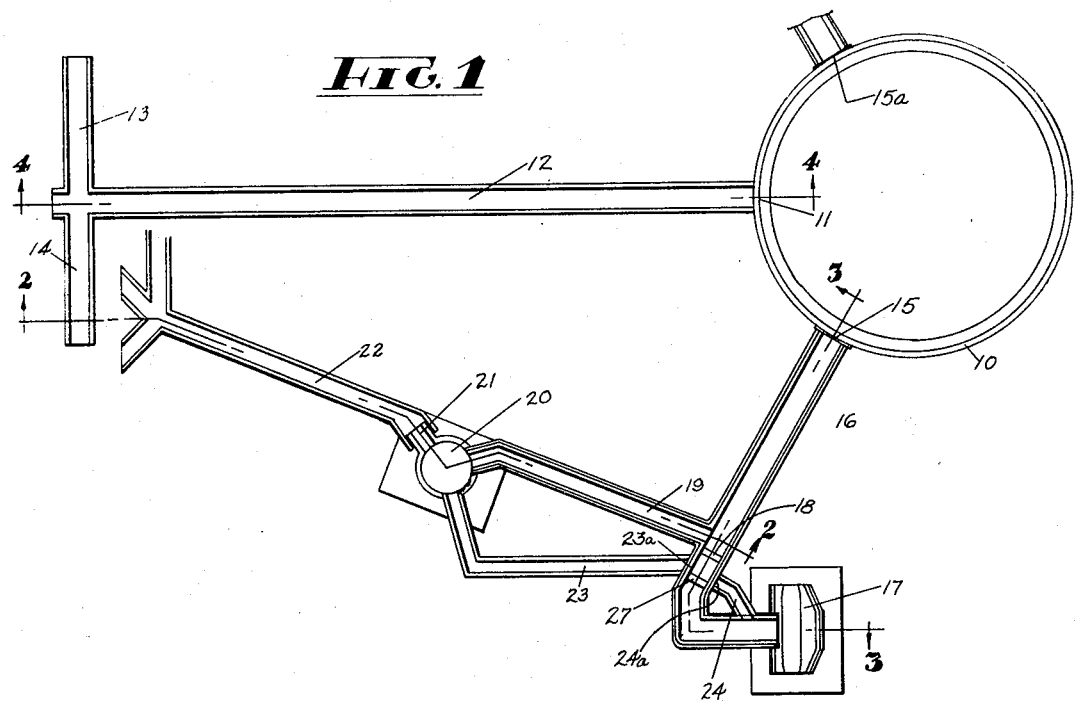
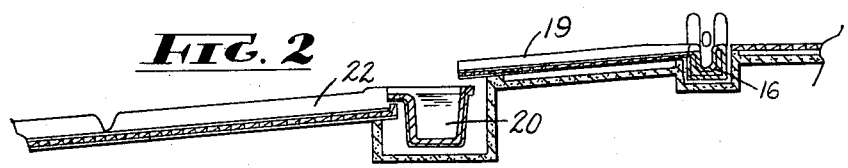
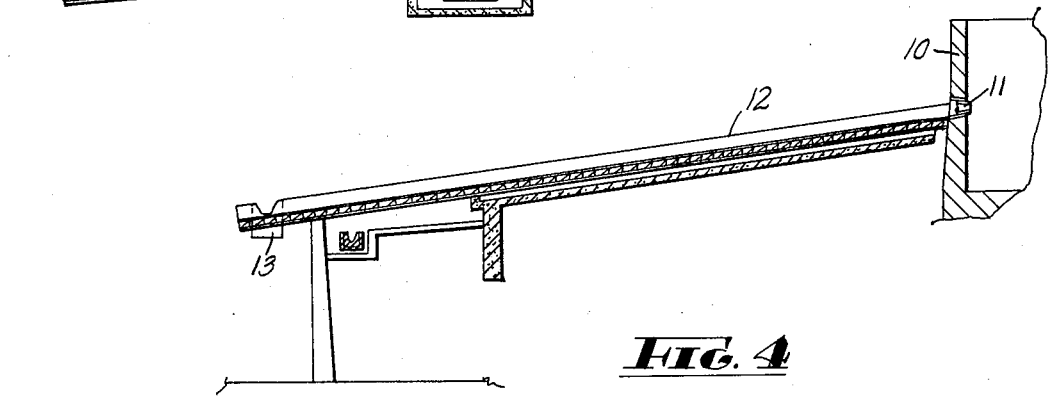
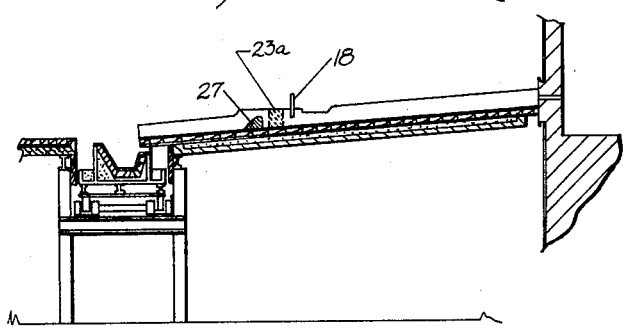
INVENTOR/S
HERBERT L. OSBORNE
KENNETH R. HALEY
BY Melville, Strasser, Foster and Hoffman
ATTORNEYS United States Patent Office 3,689,252
Patented Sept. 5, 1972

3,689,252
RUNNER SYSTEM FOR CAST HOUSE, AND
METHOD OF SEPARATING IRON AND SLAG
Herbert L. Osborne, Middletown, Ohio, and Kenneth R.
Haley, Ashland, Ky., assignors to Armco Steel Corporation, Middletown, Ohio
Filed Nov. 9, 1970, Ser. No. 87,704
Int. Cl. C21b 3/06, 7/14
U.S. Cl. 75—46    2 Claims

ABSTRACT OF THE DISCLOSURE

A runner system for a cast house, wherein the melt of a blast furnace is discharged into a trough leading to a hot metal container, the trough being provided with the usual dam and skimmer, the latter deflecting the slag and some iron into a slag runner. The slag runner discharges into an auxiliary ladle in which the iron entrained in the slag settles to the bottom. As the auxiliary ladle fills, the slag overflows into a continuation slag runner leading to a slag receptacle. At the completion of a cast, the hot metal and slag in the trough are directed down a supplementary slag runner and discharged into the auxiliary ladle. The auxiliary ladle is of sufficient capacity to hold approximately the volume of iron expected to be in the trough and the volume of iron which may be skimmed off during a cast, which may be on the order of fourteen tons. When the furnace is cast again, either through a repaired iron notch or a second (alternate) iron notch, the auxiliary ladle is discharged into the trough so as again to pass the dam and skimmer for slag separation as during a regular cast. This system and method substantially eliminates slag in the hot iron container, and the loss of iron into the slag container.

BRIEF SUMMARY OF THE INVENTION

In present day blast furnace practice, when the furnace is cast, the molten iron is discharged from an iron notch in the furnace into a trough. The trough is provided with a dam and skimmer, which are intended to prevent slag from getting into the hot iron container. Thus the skimmer skims off the slag, and with it some iron, and directs it down a slag runner for discharge into a slag container or pit. The iron entrained in the slag is of course lost.

It will be understood that at the end of a cast the contents of the trough (which may be about fourteen tons) must be removed. It is of course desirable to separate the slag and iron but it is a practical impossibility to effect anything approaching a precise separation. Ordinarily the iron from the trough is drained into the hot metal container and the operator will observe the flow from a safe distance. When he sees slag beginning to flow, he diverts the stream into a slag container. Naturally by the time the operator sees slag in the stream, some of the slag has already entered the hot iron container.

This adulteration of the iron in the iron container, and loss of iron in the slag container, have been necessary evils with present practice; and it is the principal object of this invention to eliminate these evils.

According to the invention, there is provided an auxiliary ladle interrupting the slag runner. A first portion of the slag runner discharges into the auxiliary ladle, and the overflow from the auxiliary ladle discharges into a continuation slag runner which discharges into the slag container. A connecting runner is provided, through which the contents of the trough remaining behind the dam at the end of a cast may be discharged into the auxiliary ladle. The auxiliary ladle is of sufficient capacity to hold this remaining iron therein; and this material will remain molten in the auxiliary ladle for about five hours. Normally the furnace will be cast again in about an hour, either through a second (alternate) iron notch, or a repaired single iron notch; and at this time the contents of the auxiliary ladle are dumped back into the trough, so that they again encounter the dam and skimmer, which function to separate the slag and iron as in a regular cast. In this way, loss of iron to the slag container, and adulteration of the iron in the iron container with slag, are substantially eliminated.

BRIEF DESCRIPTION OF THE FIGURES OF THE DRAWING

FIG. 1 is a somewhat diagrammatic plan view of a runner system according to the present invention.

FIG. 2 is a fragmentary cross sectional view taken on the line 2—2 of FIG. 1.

FIG. 3 is a fragmentary cross sectional view taken on the line 3—3 of FIG. 1; and FIG. 4 is a fragmentary cross sectional view taken on the line 4—4 of FIG. 1.

DETAILED DESCRIPTION

A blast furnace is diagrammatically indicated at 10. As is conventional, it is provided with a cinder notch 11 communicating with a slag runnner 12 which discharges ultimately into a slag container. The slag runner may have two outlets as at 13 and 14 so that two slag containers can be filled alternately.

The furnace will be provided with one or more iron notches 15. The drawing shows at 15a a second iron notch and it will be understood that the runner system to be described in connection with the notch 15 will be provided for any additional iron notches in the furnace. As is well understood, the iron notches are disposed at a lower level than the cinder notch 11. The cinder notch 11 and the runner system 12, 13, 14 removes the bulk of the slag from the furnace.

The iron is discharged through the iron notch 15 into a trough 16. The trough leads ultimately to a tilting runner 17 which may discharge the iron ultimately into two hot metal containers. As is well understood, the trough 16 is provided with the usual dam 27 and skimmer 18. As is also well understood, what is discharged through the iron notch 15 into the trough 16 is not pure iron but iron with some entrained slag. The purpose of the dam and skimmer is to skim off the slag floating on top of the iron flowing down the trough 16. The skimmed off slag passes through a slag runner 19 to an auxiliary ladle 20. The ladle 20 has an overflow spout 21 and a continuation slag runner 22 is disposed to conduct the overflow from the auxiliary ladle 20 to one or more slag containers.

A supplementary runner 23 is provided communicating between the trough 16 and the auxiliary ladle 20.

As is well known, the slag skimmed from the trough 16 and passing through the slag runner 19 carries considerable iron entrained with it; and in accordance with present practice, such entrained iron would be lost because the slag would be conducted directly to a slag container. According to the present invention, however, the slag with the entrained iron enters the auxiliary ladle 20 which soon fills up. When it reaches the overflow spout 21, the supernatant slag passes out over the spout 21 into the slag runner 22 while the entrained iron settles to the bottom of the auxiliary ladle. Thus, the iron entrained in the skimmed slag is not lost.

At the completion of a cast, there remains in the trough above the dam 27, a substantial amount of hot metal and slag. This may amount to some fourteen tons of molten material. Under present practice, this molten material is then discharged into the hot metal containers and carries with it some of the slag which was floating on the hot iron in the trough.

According to the present invention, at the conclusion of a cast the hot material remaining in the trough is caused to pass through the runner 23 into the auxiliary ladle 20. It will be noted that there is a gate or knock-out plug at 23a in the trough 16. When this plug is knocked out, the material remaining in the trough above the dam 27 flows out through the trough 23 into the auxiliary ladle 20. By virtue of the fact that the auxiliary ladle has been preheated by the slag entering it through the runner 19 from the skimmer 18, the iron which ultimately enters the auxiliary ladle 20 through the runner 23 will not cool rapidly and form a skull which would be wasteful of iron. This auxiliary ladle is of such capacity that it will hold the entire iron content of the trough; and in this ladle the contents will remain molten for perhaps five hours. In the meantime, the furnace is prepared for a succeeding cast which is accomplished either through the alternate iron notch or through the same iron notch, which in the meantime has been repaired. The auxiliary ladle 20 is dumped back into the trough 16 before, during, or after a succeeding cast, so that the material which was in the trough at the conclusion of the preceding cast is now caused to go through the skimmer again so that the slag supernatant in the trough at the termination of the previous cast does not get into the hot metal container. In this way the loss of iron into the slag container as well as the adulteration of the hot iron in the iron container with slag are substantially eliminated. From the practical standpoint it is preferable to allow the trough to fill before dumping the auxiliary ladle, to avoid erosion of the refractory in the trough.

At 24 is shown an emergency runner which also communicates with the trough 16 and is normally sealed off by a gate or knock-out plug 24a. The emergency runner 24 communicates with the terminal portion of the trough 16. This runner 24, which is purely an emergency runner in the present system, was used in past runner systems at the end of a cast to drain the iron from the trough 16 into the hot metal container. In the past the orifice communicating between the trough 16 and the runner 24 was relatively small and located near the bottom of the trough so that when the gate was opened or the plug knocked out, only iron theoretically would run out into the hot metal container. The operator standing at a comfortable distance would watch the stream until he could see slag running into the hot metal container. He would then plug the orifices and stop the continued flow of slag. The slag remaining in the trough would then be let out through another runner leading to a slag pit or container. Thus, in the present system the only purpose of the runner 24 is to drain the trough in the event that for some reason or other the auxiliary ladle was out of service.

It will be understood that the iron from the auxiliary ladle 20 could be used in some manner other than simply returning it to the trough as above described. Thus, for example, ingot molds may be cast directly from the auxiliary ladle if desired.

It will be understood that the foregoing description is exemplary only and that no limitation not specifically set forth is intended or should be assumed.

The embodiments of the invention in which an exclusive property or privilege is claimed are defined as follows:

1. The method of casting a blast furnace and the like, which includes the steps of
   (a) discharging molten iron, and some entrained slag, through an iron notch into a trough having a dam and skimmer,
   (b) skimming the entrained slag from the iron flowing through said trough and discharging said skimmed slag, and some iron, into a slag runner and thence into an auxiliary ladle having an overflow spout,
   (c) conducting the overflow from said auxiliary ladle to a slag container and discharging said slag thereinto,
   (d) at the end of a cast, discharging the hot metal and slag remaining in said trough above said dam into said auxiliary ladle, and,
   (e) in conjunction with a succeeding cast, dumping the contents of said auxiliary ladle back into said trough to resubject them to the action of the dam and skimmer therein.

2. A runner system for a blast furnace comprising
   (a) a trough into which molten iron, and some slag, are discharged through an iron notch, said trough discharging into a hot iron container,
   (b) a dam and skimmer in said trough,
   (c) a slag runner communicating with said trough into which the slag skimmed off in the trough, and some iron, is discharged,
   (d) an auxiliary ladle having an overflow spout into which said slag runner discharges,
   (e) a continuation slag runner leading from said overflow spout and discharging into a slag container,
   (f) a supplemental runner leading from said trough to said auxiliary ladle, and
   (g) means for discharging the molten material remaining in said trough above said dam at the end of a cast into said supplemental runner for discharge into said auxiliary ladle.

References Cited

UNITED STATES PATENTS

| | | | |
|---|---|---|---|
| 2,409,741 | 10/1946 | Dobscha | 266—38 |
| 1,572,864 | 2/1926 | McKune | 266—38 |
| 608,143 | 7/1898 | Killeen | 266—38 |
| 912,688 | 2/1909 | Killeen | 266—38 |
| 1,611,212 | 12/1926 | Lose | 266—38 |
| 2,139,949 | 12/1938 | Forsythe et al. | 266—38 |
| 463,514 | 11/1891 | Keiper | 266—37 |
| 1,554,368 | 9/1925 | Rackoff et al. | 266—38 |

HENRY W. TARRING II, Primary Examiner

U.S. Cl. X.R.

75—61; 266—37, 38